United States Patent

Sugimoto et al.

[11] Patent Number: 5,969,827
[45] Date of Patent: Oct. 19, 1999

[54] COMMUNICATION DEVICE WITH TIME ADJUSTMENT FUNCTION

[75] Inventors: Tetsuya Sugimoto; Kohichi Shibata; Masakazu Oyama; Kohichi Matsuo; Toshihiro Mori, all of Osaka, Japan

[73] Assignee: Mita Industrial Co., Ltd., Osaka-fu, Japan

[21] Appl. No.: 08/929,873

[22] Filed: Sep. 15, 1997

[30] Foreign Application Priority Data

Sep. 20, 1996 [JP] Japan .................................. 8-249383

[51] Int. Cl.$^6$ .............................. H04N 1/00; H04M 11/00
[52] U.S. Cl. ...................... 358/400; 358/405; 379/100.06
[58] Field of Search .................................. 358/400, 434, 358/435, 436, 438, 442, 403, 405, 439, 440; 379/100.01, 100.06

[56] References Cited

U.S. PATENT DOCUMENTS 5,293,355  3/1994  Widen .................................. 368/19
5,349,447  9/1994  Kuwahara ........................... 358/404
5,673,256  9/1997  Maine .................................... 370/271

*Primary Examiner*—Jerome Grant, II
*Attorney, Agent, or Firm*—Jordan and Hamburg LLP

[57] ABSTRACT

A communication device includes: T/D data generating means for generating T/D data according to a calendar; storage means for edittably storing T/D data regarding a beginning and an end of a specified time period; judgement means for judging whether the T/D data generated by the T/D date generating means is in the specified time period; T/D data changing means for changing the T/D data of the T/D generating means to T/D data according to the preset T/D data; wherein the T/D data regarding the beginning and the end of the specified time period is set or replaced with a data supplied via communication line from a certain communication center.

2 Claims, 4 Drawing Sheets

STD : STANDARD
DST : DAYLIGHT SAVINGS TIME
T / D : TIME / DATE
FAX : FACSIMILE MACHINE

COMMUNICATION DEVICE WITH TIME ADJUSTMENT FUNCTION

The present invention relates to a communication device that enables a display of the time/date information updated due to the effect of "Daylight Savings Time" in a specific time period in the region according to a calendar and standard time information.

BACKGROUND OF THE INVENTION AND RELATED ART STATEMENT

There are some countries in which the "Daylight Savings Time" was introduced and in such a country, a time adjustment is mandated twice a year to meet the time shift due to the Daylight Savings Time. During the Daylight Savings Time period in such a country, it is required to adjust the time/date information (i.e., Year/Month/Day/Time) of the communication device such as a facsimile machine from the time/date data based on the standard time to the time/date based on the Daylight Savings Time period.

In an ordinary case, such time adjustment due to the Daylight Savings Time (hereinafter referred to as "DST" for short) is carried out by the operator. In some other case, there exists a facsimile, representing the communication device of this invention, has a function to adjust the time change due to the DST. Such a facsimile has a data storage memory for storing time/date information of the DST including a beginning date of the DST and an end date of the DST and means for automatically changing the time/date information from the one according to the standard time of the particular region (or a country) to the time/date information according to DST period when the region enters to the DST period and automatically switch back to the time/date according to the standard time when the DST period ends.

In the former conventional communication device described in the above, the user has to manually adjust the time/date information of the device at the beginning of the DST period and the end of the period. Thus the adjustment itself by the user could be a cumbersome task and moreover if the user neglects such adjustment, the wrong time/date information appears on the display of the device.

Even with the latter mentioned facsimile device as a prior art technology having a function of automatic time adjustment due to the DST, if the device still has to rely on the user's input data including a beginning date of the DST and an end date of the DST, very similar problems as described will result.

If, however, the latter mentioned device stores in advance information regarding the beginning and the end of the DST period in all the regions and countries employing DST, needlessly large memory is required for storing the information as practically speaking only one set of data is needed for the facsimile machine; thus the rest of the stored data would never be used unless the machine was transferred to the other regions.

SUMMARY OF THE INVENTION

In view of the above, an object of the present invention is to solve the problems of the conventional communication device. It is another object of this invention to provide a communication device that does not necessitate user dependent time adjustment due to the specified time period. It is still another object of this invention to provide a communication device that enables a time adjustment due to the specified time period without having storage unit storing all the relevant information regarding the beginning and the end of the specified time period in the respective regions.

To fulfill the above objects, according to this invention, a communication device comprises: time/date (T/D) data generating means for generating T/D data according to a calendar; storage means for edittably storing T/D data regarding a beginning and end of a specified time period; judgement means for judging whether the T/D data generated by the T/D date generating means is in the specified time period; T/D data changing means for changing the T/D data of the T/D generating means to T/D data corresponding to a preset T/D data when the T/D data generated by the T/D data generating means is in the specified time period and wherein the T/D data regarding the beginning and end of the specified time period is set or replaced with data supplied a certain communication center.

With the above communication device, data setting or replacement can be carried out via a remote operation at the certain communication center, thus unreasonably large quantity of data regarding the beginning and the end of the specified time period in the respective regions (or countries) does not have to be stored, rendering to greatly lessen the storage capacity of the storage unit in this respect. It also enables the time/date adjustment without relying on user thereby cutting out the user's cumbersome task due to the time change caused by the specified time period.

These and other objects, features and advantages of the present invention will become more apparent upon reading of the following detailed description and accompanying drawings.

DETAILED DESCRIPTION OF THE PREFERRED EMBODIMENTS OF THE INVENTION

Figure 1:
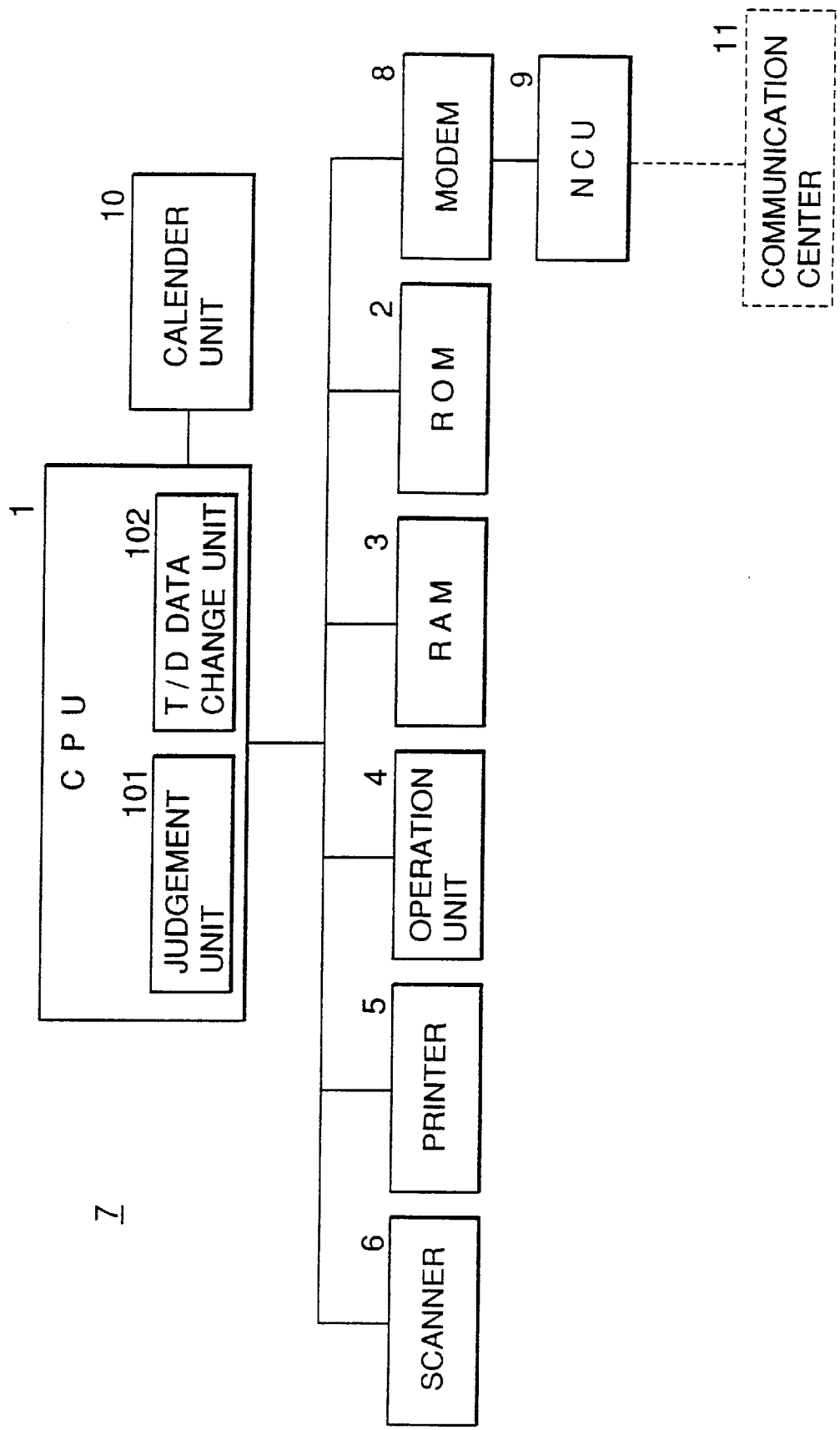
FIG. 1 is a block diagram showing one example of facsimile machines of this invention.

One embodiment of the invention is described along with a facsimile machine taken as an example of a communication device. FIG. 1 is a block diagram showing a structure of the facsimile machine as one embodiment of this invention. In FIG. 1, numeral 1 is a CPU (central processing unit) for controlling operations of the facsimile machine according to predetermined programs. This facsimile 7 has a function to change a time/date data (i.e., the data such as 1997/08/28/15:35-Year/Month/Day/Time/) between a standard time/date (T/D) data and a DST based time/date (T/D) data based on predetermined time/date (T/D) data regarding the beginning and the end of the Daylight Savings Time (hereinafter also referred to simply as DST). This function is hereinafter referred to as a DST automatic data(time) change function or a DST automatic data(time) adjustment function in the later part of this section.

In the CPU 1, there exists a judgement unit 101 for judging whether the present time is in the DST period or not with comparison of a standard time/date data (hereinafter also referred to as STD T/D DATA) read from a calendar unit 10 with a predetermined data regarding a beginning and an end of the DST and a time/date (T/D) data change unit 102 for changing the T/D data between the STD T/D DATA and the DST BASED T/D DATA in accordance with a result of the judgement by the judgement unit 101. The calendar unit 10 has T/D data generating circuit for generating data of the present time based on a reference clock and stores a predetermined calendar data to produce a STD D/T DATA based on the present time data and the calendar data.

It should be noted some abbreviations are used for the specified terms throughout this section to avoid repetitions of lengthy words.

The terms to be abbreviated are:

Data regarding the beginning and the end of Daylight Savings Time=DST Beg/End Data or DATA of DST Beg/End (Dates);

Daylight Savings Time=DST;

Time/Date=T/D;

Time/Date Data=T/D DATA

Standard=STD

Standard Time=STD TIME

Standard Time/Date Data=STD T/D DATA

Daylight Savings Time Based Time/Date Data=DST BASED T/D DATA;

It should also be noted, however, even if the term in its none abbreviated form appears in the later section, it should not be considered that there is another meaning attached to the term unless otherwise indicated.

Numeral 2 represents a ROM (read only memory) for storing programs and the like of the CPU 1. This ROM 2 stores a processing program regarding the DST automatic data change function. Numeral 3 represents a RAM (random access memory) for storing the transmission and receiving DATA of DST Beg/End Dates. As described in the latter part of this section, this DATA of Beg/End DATES is used for the facsimile machine to automatically change the T/D data between the STD T/D data and the DST BASED T/D data considering if the present time is in the DST period. This RAM 3 is preferably a power-back-up type and maybe replaceable with an EPROM or an EEPROM type.

Numeral 4 represents an operation unit for reading instructions inputted to respective operations of the facsimile machine. An operator with the use of operation unit 4 can set dates of beginning and end of the DST. Numeral 5 represents a printer unit for printing out the data in receipt and the like, numeral 6 represents a scanner for reading the document (and image) data to be transmitted. Numeral 8 represents a modem 9 for converting the data to be transmitted in digital signal to analog signal when in data transmission and restoring the analog signal received from a telephone line (as a communication line) to the digital signal when in data receipt. Numeral 9 represents an NCU (network control unit) for transmitting a dialing signal via a telephone line when in the data transmission to establish a communicable line by dialing at a specific number and for allowing the CPU 1 to sense a call arrival by sensing the dialing signal when in data receipt.

The facsimile machine 7 performs a specified operation in accordance with the instructions given from a specified communication center 11 (such as another facsimile machine, a personal computer and the like) 11. Specifically, the facsimile machine 7 is enabled to perform a transmission of the self-stored data upon receipt of such given instruction from the communication center 11 and a data replacement with the data transmitted from the communication center 11. The predetermined data transmittable to the facsimile machine 7 includes data regarding the DST in a specific region (or a specific country) such as DATA of DST Beg/End Dates; a time difference data (TIME DIF DATA) for mutually changing the T/D data between the STD T/D data and the DST BASED T/D data, and a flag (and its equivalent) to indicate a completion of the automatic time data change from the STD T/D data to the DST BASED T/D data. With this data, the communication center 11 performs a set and a replacement of the DATA of DST Beg/End Dates in the facsimile machine in communication with the center 11.

In other words, DATA of DST Beg/End Dates can be read in the RAM 3 of the facsimile machine 7 and the data already stored in the RAM 3 can be replaced with the data stored in the communication center 11 via a remote operation at the communication center 11. It should be noted that it is possible to input the DST Beg/End DATA to the facsimile machine 7 from the operation unit 4 side. Based on the DST Beg/End DATA stored in the RAM 3, the CPU 1 of this facsimile machine 7 performs a change of the STD D/T data to the DST BASED T/D data and vice versa.

Next, with reference to a flowchart of FIG. 2, the operations of the DST automatic data change function are described as in the following.

At step 10, the DST Beg/End DATA is set or not is questioned (i.e., the DST Beg/End DATA is stored in the RAM 3 or not?). If the answer at step 10 is "No"(the DST Beg/End DATA is not stored in the RAM 3), then the routine of this flowchart is advanced to step 45 to terminate the operation as the DST automatic time change operation can not be performed without the data. If the answer at the step 10 is "Yes" (the DST Beg/End DATA is stored in the RAM 3), then the routine of this flowchart advances to step 15 to determine if the T/D data of the facsimile machine 7 is accorded with the DST BASED T/D data. At the step 15, if the present T/D data of the facsimile machine 7 was not yet changed to the DST BASED T/D data (the present time of the facsimile machine indicates a STD T/D data—"No" at step 15), the routine advances to step 20 to determine if the STD T/D data stored in the RAM 3 is in the DST period. If the STD T/D data stored is out of the DST period ("No" at the step 20), then the present time data indicated by the facsimile machine 7 does not have to be replaced with the DST BASED T/D data, thus the operation completes. On the other hand, if the STD T/D data stored is in the DST period ("Yes" at the step 20), then the present T/D data indicated by the facsimile machine 7 needs to be replaced with the DST BASED T/D data, thus the data replacement (replacing the STD T/D data with the DST BASED T/D data) is carried out at step 30, then the operation completes.

At the step 30, the data replacement is carried out by addition (or subtraction) of the time difference data (TIME DIF DATA) to (or from) the STD T/D DATA.

At the step 15, if the STD TIME DATA of the facsimile machine 7 was already replaced with the DST BASED T/D DATA ("Yes" at the step 15), the routine advances to step 25 to determine if the DST BASED T/D DATA is in the DST period stored in the RAM 3. If the DST BASED T/D DATA is in the DST period stored in the RAM 3 ("Yes" at the step 25), then DST BASED T/D DATA does not have to be replaced with the STD T/D DATA, the operation completes at this step. On the other hand, if, however, the DST BASED T/D DATA is out of the DST period stored in the RAM 3 ("No" at the step 25), the routine advances to step 35 to replace the DST BASED T/D DATA with the STD T/D DATA, then this routine completes. The replacement of the T/D DATA from the DST BASED T/D DATA to the STD T/D DATA is carried out by subtraction (or addition) of the TIME DIF DATA from (or to) the DST BASED T/D DATA.

Figure 2:
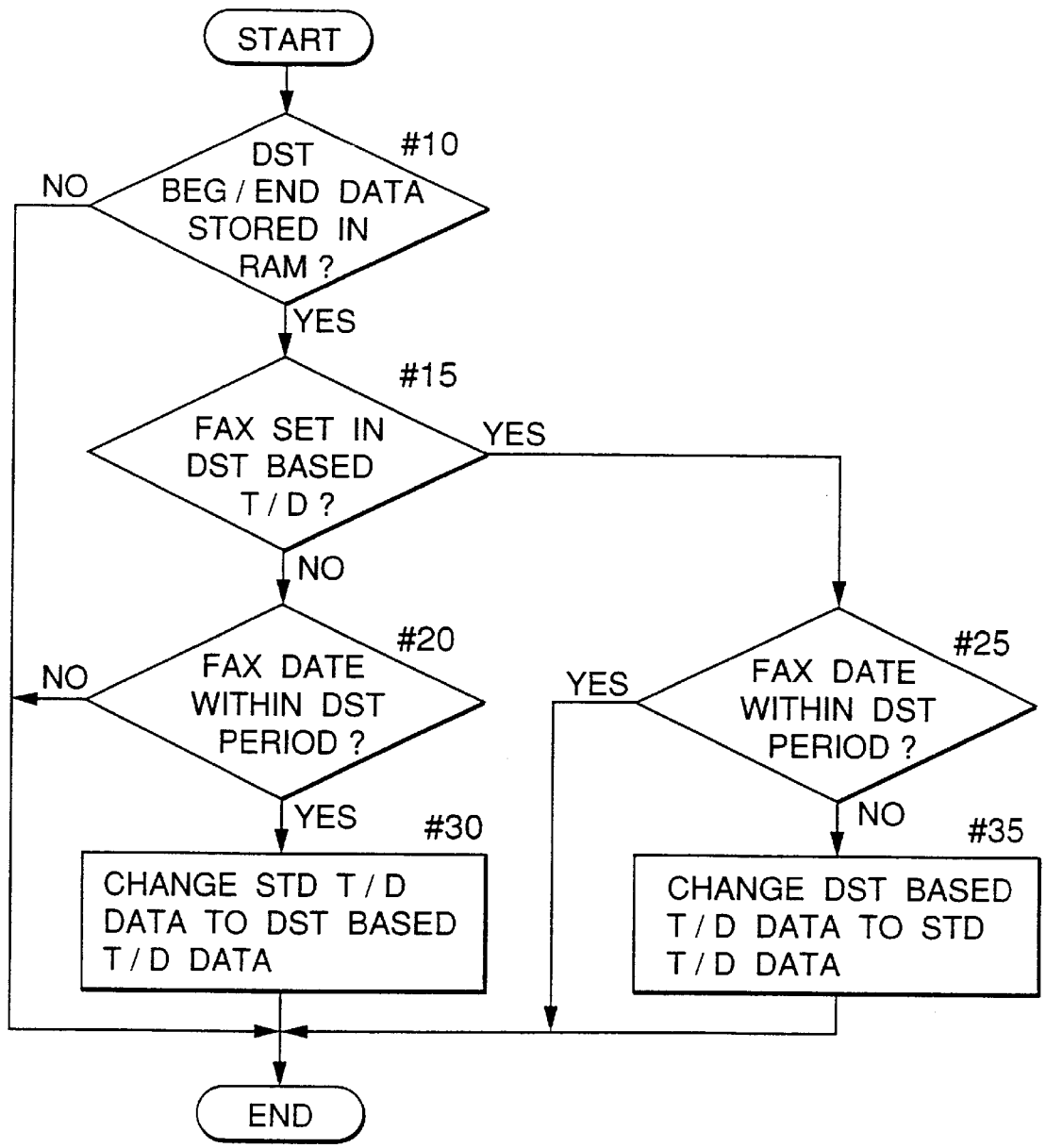
FIG. 2 is a flowchart showing operational procedures regarding the switch between STD time/date and DST based time/date of the facsimile machine.

In case the ROM 2 is set to carry out the routines shown in FIG. 2 at the time of each beginning and end of the DST, then the time adjustment operation at the steps 30 and 40 (change from STD T/D to DST BASED T/D or change from DST BASED T/D to STD T/D) is carried out on the date that is set by the user.

In the following, we would like to describe the procedures of the setting the time of the beginning and the end of the DST of the facsimile machine 7 through a remote operation of the communication center 11 with reference to flowcharts shown in FIGS. 3 and 4.

Figure 3:
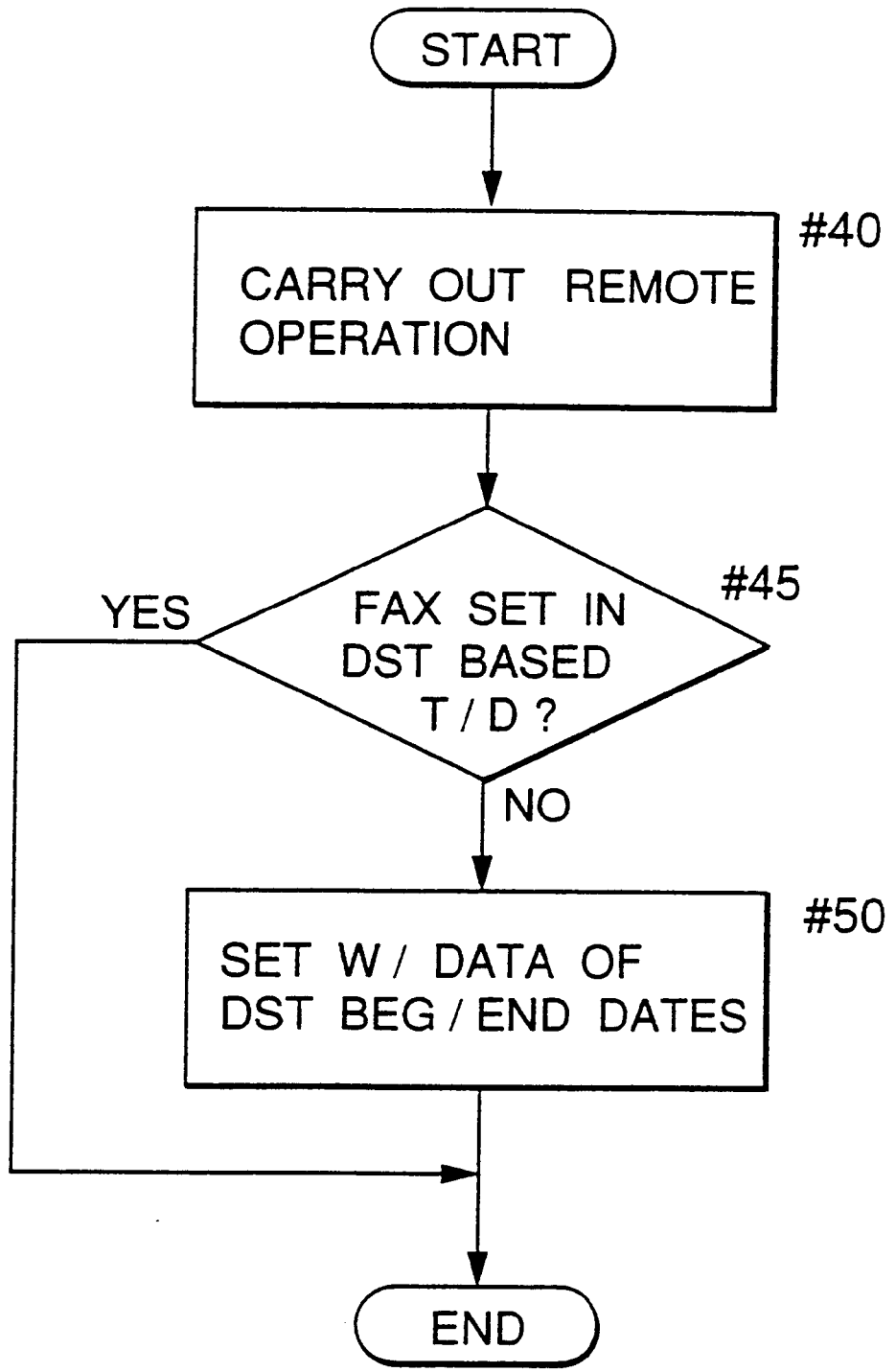
FIG. 3 is a flowchart showing a first embodiment of setting procedure in which the data of DST beginning and end dates of the facsimile machine is set via a remote operation of a communication center.

FIG. 3 is a flowchart showing procedures of the remote operation according to the first embodiment of this invention.

At the beginning, a remote operation on the facsimile machine 7 as one of the terminals is conducted by the communication center 11 (At step 40). Through this remote operation, the communication center 11 will read out the flag that indicates as to if the automatic time adjustment for the DST has taken place on the facsimile machine 7. With the indication of the flag of the individual facsimile machine 7 to be read by the communication center 11, it is decided if the time adjustment for the DST has taken place already or not (at step 45). When the answer at step 45 is "Yes" (time adjustment has taken place), then it is judged that the DST automatic time adjustment function of the facsimile machine 7 is working properly and then completes the operation right at this step.

On the other hand, when time adjustment for the DST has not yet carried out ("No" at step 45), then it is to be judged that the DST automatic time adjustment function is not properly working because of the improper setting for the beginning and end dates of the DST period. Then the routine advances to step 50 where the DATA of DST Beg/End Dates is sent from the communication center 11 to the facsimile machine 7 to complete the routine. Then the data regarding the beginning and end of DST received from the communication center 11 is written in the RAM 3 of the facsimile machine 7. When storing the received data in the RAM 3 and if the DATA of DST Beg/End Dates was already stored in the RAM 3 (for instance, by an initial setting or a setting by the operation unit 4), regardless of the correctness of data stored in the RAM 3 with respect to the data received from the communication center 11, the data stored in the RAM 3 is replaced with the data sent from the communication center 11.

Figure 4:
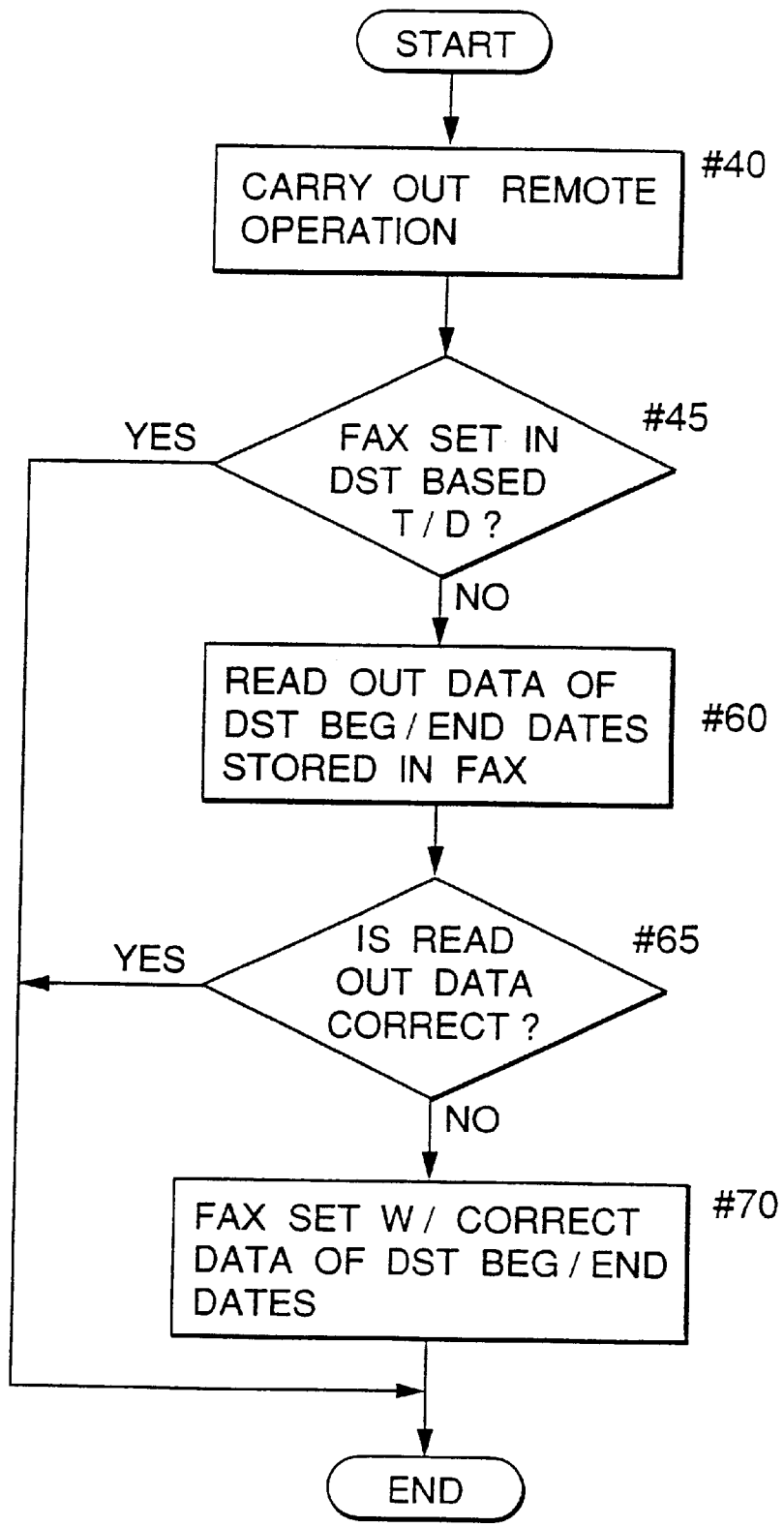
FIG. 4 is a flowchart showing a second embodiment of setting procedure in which the data of DST beginning and end dates of the facsimile machine is set via a remote operation of the communication center.

FIG. 4 is a flowchart showing the steps according to a second embodiment of the remote operation by the communication center 11.

In the first embodiment, correctness of the operation of the automatic time adjustment function of the facsimile machine 7 is judged and when it is determined that the automatic time adjustment function is not working properly, then the DATA of DST Beg/End Dates is sent to the facsimile machine 7 to replace the existing data via remote operation at the communication center 11. On the other hand, in the second embodiment, to be judged is not the operability of the automatic time adjustment function but the correctness of the DATA of DST Beg/End Dates stored in the RAM 3 of the facsimile machine 7. Then if determined the DATA of DST Beg/End Dates stored in the RAM 3 is not correct, the data is corrected by replacing the data with the correct data sent from the communication center 11 via remote operation therefrom.

In FIG. 4, the same numeral is used to indicate the same step as in the flowchart of FIG. 3; thus only the different steps from the first embodiment will be described in the following.

At step 45, the flag of the facsimile 7 is checked to see if the DST automatic time adjustment operation is properly performed. Then if the time adjustment operation at the step 45 is not determined to be performed ("No" at step 45), the read out by the communication center 11 is the DATA of DST Beg/End Dates stored in the RAM 3 of the facsimile machine 7 at step 60. In the communication center 11, correctness of the contents of the data read out from the RAM 3 of the facsimile machine 7 is judged at step 65, then if judged the data is correct, then it is decided that data replacement is not necessary, so the routine ends here. On the other hand, if the data read out from the RAM 3 of the facsimile machine 7 is judged to be incorrect ("No" at step 60), then the correct DATA of DST Beg/End Dates is transmitted from the communication center 11 to the facsimile machine 7 (at step 70) to end the routine. In the facsimile machine 7, the data received from the communication center 11 replaces the old data existed in the RAM 3 regardless of the contents of the old data. Accordingly, with the routine of the second embodiment, only when the DATA of DST Beg/End Dates stored in the RAM 3 is incorrect, the data is replaced with the data sent from the communication center 11.

In summing up the first and the second embodiments of this invention, the following observation can be made.

With the first embodiment of this invention, when the operation of the data adjustment function of the communication device is not properly working then the data replacement/set by the remote operation from the communication center is performed. On the other hand, with the second embodiment of this invention, only when the DATA of DST Beg/End stored in the communication device is incorrect, the data replacement/set by the remote operation from the communication center is performed In the foregoing embodiments, the DST (Daylight Savings Time) is used as a specified time period that requires a time adjustment, the specified time period is not limited to the DST, it could be the one set in consideration with the convenience of the user's working condition. In addition, the application of the invention is not limited to the facsimile machine as in the foregoing description, the invention is applicable to these devices having a T/D display other than the facsimile machine.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A communication device comprising:

time/date (T/D) data generating means for generating T/D data according to a calendar;

storage means for edittably storing T/D data regarding a beginning and an end of a specified time period;

judgement means for judging whether the T/D DATA generated by the T/D DATA generating means is in the specified time period;

T/D DATA changing means for changing the T/D DATA of the T/D generating means to the T/D DATA corresponding to a preset T/D DATA when the judgement means judged that the T/D DATA generated by the T/D DATA generating means is in the specified time period;

wherein the T/D DATA regarding the beginning and the end of the specified time period is set or replaced with a T/D DATA supplied from a communication center, the communication center judging whether or not an operation or adjustment in the T/D DATA of the communication device is properly performed based on the information regarding the adjustment operation in the T/D DATA transmitted from the communication device and the set/replacement of the T/D DATA regarding the beginning and the end of the specified time period is performed when the adjustment operation of the T/D DATA is not properly performed.

2. The communication device according to claim 1, wherein the communication center judges whether or not the T/D DATA regarding the beginning and the end of the specified time period that is transmitted from the communication device is correct and the data set/replacement of the T/D DATA regarding the beginning and the end of the specific time period is performed when the T/D DATA regarding the beginning and the end of the specified time period stored in the storage means is incorrect.

* * * * *